I. A. BURNETT.
ATTACHMENT FOR PULLEYS.
APPLICATION FILED JUNE 7, 1920.
1,376,742.
Patented May 3, 1921.
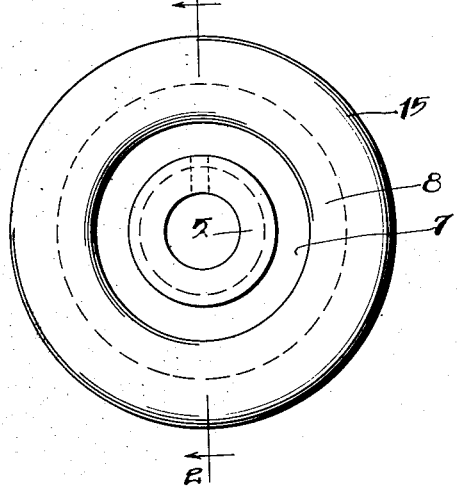
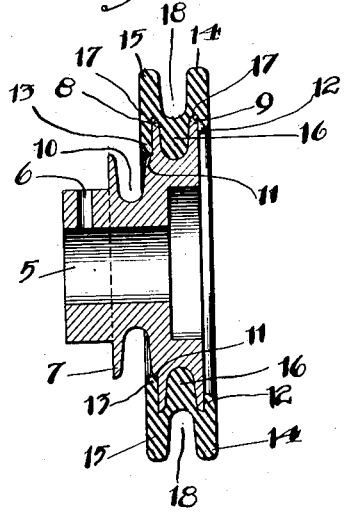
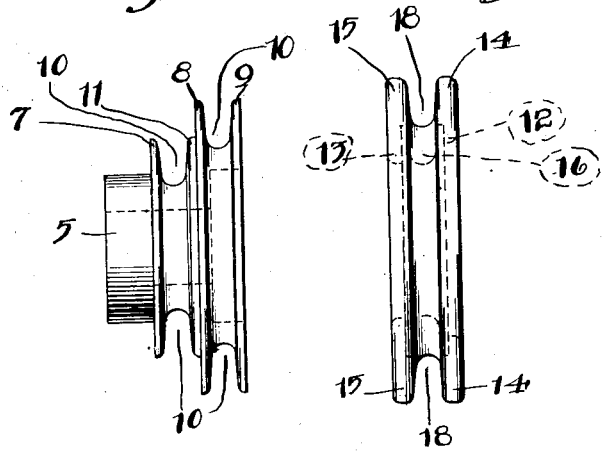
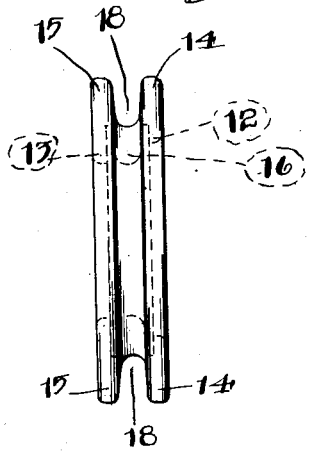
Witness
Geo. L. Lawrence
Inventor
Ira A. Burnett
By Chas. A. Tillman
Atty.

UNITED STATES PATENT OFFICE.

IRA A. BURNETT, OF CHICAGO, ILLINOIS.

ATTACHMENT FOR PULLEYS.

1,376,742.   Specification of Letters Patent.   Patented May 3, 1921.

Application filed June 7, 1920. Serial No. 387,112.

*To all whom it may concern:*

Be it known that I, IRA A. BURNETT, a citizen of the United States, residing at Chicago, in the county of Cook and State of Illinois, have invented certain new and useful Improvements in Attachments for Pulleys, of which the following is a specification.

This invention relates to pulleys in general, but has particular relation to that class of pulleys used in connection with dental engines, and which are provided with peripheral or annular grooves for the reception and operation of belts, usually in the form of cords or cables, employed for the transmission of power.

While the invention is more particularly intended for use in connection with grooved pulleys employed on dental engines, and it is so shown in the drawing forming a part of this specification and will be hereinafter so described, yet it will be obvious that it is applicable for use on pulleys without grooves in their peripheries on belt engaging surfaces, and for this reason I do not desire to be understood as limiting myself in its applicability to any specific type of pulleys.

The invention consists in certain peculiarities of the construction, novel arrangement and operation of the various parts thereof, as will be hereinafter more fully set forth and specifically claimed.

As is well known to dentists, as well as to others skilled in the art to which the invention pertains, grooved pulleys of the construction heretofore in general use become worn at the bases of their grooves by the operation of the belts used in connection therewith, to such an extent that the belts slip or fail to transmit power properly, and besides require frequent adjustment in their lengths, or "hitches" to be taken therein to accommodate for the wear of the hubs or cores of the pulleys.

After considerable use, the pulleys become so badly worn at their belt engaging surfaces that they have to be discarded and replaced by new ones. As the pulleys used on dental engines are made of high grade material and by skilled workmen, they are of course, costly, and to avoid frequent purchase of new ones, by furnishing a simple and inexpensive attachment of such construction that it can be readily placed in operative position on a pulley or easily removed therefrom, to the end, that when its belt engaging surface shall have become worn or deficient, it can be removed and replaced by a new and more efficient attachment, is one of the objects of the invention.

Another object of the invention is to provide an attachment for pulleys which shall be made of resilient material, to the end, that it can be easily placed on and removed from a pulley and which will provide a belt engaging surface of such character that the belt will have a better grip thereon and slipping of the same will be practically eliminated.

Other objects and advantages of the invention will be set forth in the following description and explanation.

In the accompanying drawing—

Figure 1 is a face view of a pulley equipped with an attachment embodying my invention.

Fig. 2 is a central sectional view taken on line 2—2 of Fig. 1 looking in the direction indicated by the arrows.

Fig. 3 is a plan or side view of a pulley without the attachment, and

Fig. 4 is a detached plan view of the attachment.

Like numerals of reference refer to corresponding parts throughout the different views of the drawing.

The reference numeral 5 designates the hollow hub of a pulley which may be mounted on a suitable shaft and rigidly secured thereto by means of a set screw located in an opening 6 near one of the ends of the hub. As is clearly shown in Fig. 2 of the drawing the hub is provided with a plurality of peripheral flanges 7, 8 and 9 which are spaced apart and provide annular grooves or guideways 10 which are ordinarily employed for the reception and guidance of a belt used for transmitting power from the pulley to another part.

In the present instance, I have shown the pulley as being of the double type, or as having two of the grooves 10 from one of which to the other the belt can be changed as desired, but it will be understood that one of the flanges, for example, the flange indicated by the numeral 7, may be omitted when it is apparent that a hub of the single groove type will be provided. The flange 8 is by preference provided on its surface opposite the flange 9 with an annular shoulder 11 which is concentric with the hub and the flange 8 but located some distance inwardly from the free edge of said flange.

In the drawing, I have shown the attachment embodying my invention as being constructed for application to one pair of flanges and the resultant groove there-between only. The attachment consists of an annular member or ring made of rubber or any other suitable resilient material and having on its inner periphery a pair of inwardly extended flanges 12 and 13 and on its outer periphery a pair of annular flanges 14 and 15. Between the flanges 12 and extended inwardly of the circular attachment is an annular rib 16 which is separated from the flanges 12 and 13 by outwardly extended recesses 17 in which are located the flanges 8 and 9 of the pulley. The rib 16 is cross-sectionally rounded at its inner portion to rest against the base of the groove 10. The flange 12 of the attachment is of less width than the flange 13 which latter flange is adapted to rest at its inner or free edge against the shoulder 11 on the outer surface of the flange 8 of the pulley. By this arrangement it is apparent that as the attachment is made of resilient or elastic material, it can be readily placed in position on the pulley by stretching the ring sufficiently to permit the rib 16 to be located between the flanges 8 and 9 of the pulley when by reason of the elasticity or resiliency of the attachment it will contract itself so that the rib 16 will fit closely between the flanges 8 and 9 of the pulley and in such a manner that the inner surface of the rib 16 will rest firmly against the base of the groove 10 of the pulley. When in this position the recesses 17 of the circular attachment will receive and hold the flanges 8 and 9 in such a way that the attachment will be securely retained in position. The spaced flanges 14 and 15 of the attachment provide there-between an annular groove 18, the base of which terminates at the outer surface of the rib 16 and thus a resilient belt engaging member will be provided for the reception and operation of the belt used in connection with the pulley. As the attachment is made of resilient material, it is obvious that the belt engaging surface or portion thereof will afford a better gripping surface or track for the belt than that provided by a metallic surface, and it is further evident that after the attachment becomes materially worn or damaged, it can be quickly removed from the pulley and replaced by a new or perfect attachment at a very small expense.

While I have shown the attachment provided with an inwardly extended rib 16 on its inner periphery to fit within the groove 10 of the pulley, and will so construct it when used in connection with the grooved pulley, yet it will be understood that by omitting the inwardly extended rib 16 located between the flanges 12 and 13 of the attachment, but by employing said flanges, the attachment can be successfully applied to a pulley having a cylindrical surface or one without the peripheral groove therein, for it is manifest that the flanges 12 and 13 of the attachment will clamp the sides of the pulley and thus hold the attachment in position thereon.

Having thus fully described my invention, what I claim as new and desire to secure by Letters Patent is—

1. An attachment for pulleys consisting of a relatively stiff annular resilient member having in its inner periphery a pair of spaced annular grooves for the reception of the flanges of a pulley and on its outer periphery a pair of spaced annular flanges providing there-between an annular groove, for the reception and operation of a belt.

2. An attachment for pulleys consisting of a relatively stiff annular resilient member having in its inner periphery a plurality of spaced annular grooves for the reception of flanges on a pulley and on its outer periphery a plurality of spaced annular flanges providing between each pair of said outer flanges an annular groove.

3. An attachment for pulleys consisting of a relatively stiff annular resilient member having in its inner periphery a plurality of spaced annular grooves for the reception of spaced flanges on a pulley and on its outer periphery a plurality of spaced annular flanges providing between each pair of flanges an annular groove, an annular rib extended inwardly between the grooves in the inner periphery of the member.

4. An attachment for pulleys consisting of a relatively stiff annular resilient member having on its inner periphery a pair of laterally spaced flanges and between said flanges a pair of laterally spaced grooves for the reception there-between of a pulley and its flanges and on its outer periphery a pair of spaced annular flanges providing there-between an annular groove for the reception of a belt, an annular rib extended inwardly between the grooves in the inner periphery of the member, one of the flanges of said member being greater in diameter than the other flange thereof.

IRA A. BURNETT.